Patented May 16, 1944

2,349,173

UNITED STATES PATENT OFFICE 2,349,173

MANUFACTURE OF ALICYCLIC COMPOUNDS

Lloyd M. Joshel, Hyattsville, Md., assignor to United States of America as represented by Claude R. Wickard, Secretary of Agriculture, and his successors in office No Drawing. Original application October 16, 1941, Serial No. 415,263. Divided and this application March 31, 1944, Serial No. 528,927

2 Claims. (Cl. 260—666)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a new process for manufacturing organic compounds of the alicyclic class.

This is a division of my application for patent, Serial No. 415,263, filed October 16, 1941.

In general, the process comprises reacting ethylene with a conjugated diene, also known as 1,3-diene, under the action of heat. The reaction proceeds by the 1,4-addition of the ethylene to the diene, whereby the alicyclic compound produced has, in each case, one additional six-membered ring than the starting diene.

By means of this process a large number of alicyclic compounds can be synthesized which are not otherwise readily available, such as cyclohexene and derivatives thereof, including the alkyl, aryl, alkyloxy, carboalkoxy, and halogeno derivatives. In addition to these monocyclic compounds, various polycyclic compounds can also be formed.

More specifically, this invention comprises heating the ethylene and a 1,3-diene at an elevated pressure until an alicyclic compound is formed having one more six-membered ring than the original diene. In general, the reaction is indicated as follows:

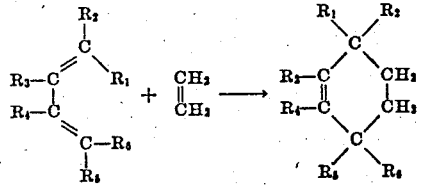

where one or more of the pairs consisting of $R_1$ and $R_5$, $R_2$ and $R_3$, $R_4$ and $R_5$, and $R_3$ and $R_4$ may be connecting bridge linkages consisting of

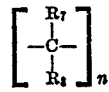

$n$ being an integer, and where substituents $R_7$ and $R_8$ and substituents $R_1$, $R_2$, $R_3$, $R_4$, $R_5$, and $R_6$, not already included in a bridge linkage, are chosen from the group consisting of alkyl, aryl, alkyloxy, carboalkoxy, halogen, and hydrogen.

The particular temperature and pressure at which the reaction is most favorably carried out depends in each case upon the characteristics of the conjugated diene used. In most cases, a temperature in the range of 175° to 300° C. is applicable, although it is possible that certain conjugated dienes will react at lower temperatures and that greater yields may be obtained with other compounds at higher temperatures. The temperature used, however, in any case should not be so high as to have a destructive effect upon the final product being formed. The pressures used also depend a great deal upon the character of the diene being used, as well as the vessel in which the reaction is carried out. Generally, there is not a critical upper limit with respect to pressure and, ordinarily, pressures above about 1,000 pounds per square inch at room temperature can be used to obtain satisfactory results.

The following examples will further illustrate the invention:

*Example I*

Forty grams of 1,3-butadiene and about 200 cubic centimeters of ethylene were sealed in a rocking-type autoclave at room temperature under a pressure of about 900 pounds per square inch. The autoclave was then heated to about 200° C., whereupon the pressure rose to about 4,500 pounds per square inch. After shaking at this temperature for 15 hours the pressure dropped to about 2875 pounds per square inch. The system was then cooled to room temperature, and the cyclohexene formed was recovered by fractional distillation of the contents of the autoclave. The reaction is indicated as follows:

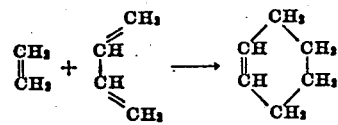

*Example II*

About 200 cubic centimeters of ethylene and 39 grams of 2,3-dimethyl-1,3-butadiene were sealed in a rocking-type autoclave at room temperature under a pressure of 1,175 pounds per square inch and heated to about 200° C. The pressure rose to 6,200 pounds per square inch. The autoclave was shaken for 21 hours at 190° to 200° C., during which the pressure gradually dropped until it became constant at 3,550 pounds per square inch. The system was then cooled to room temperature and the 1,2-dimethylcyclohexene formed was isolated by fractional distillation. The reaction is indicated as follows:

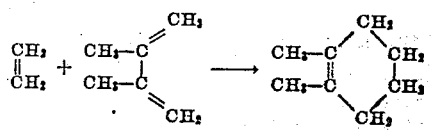

Having thus described my invention, I claim:

1. The process of manufacturing cyclohexene, comprising heating ethylene and 1,3-butadiene at a temperature below about 300° C. and at a pressure above 1000 pounds per square inch until the cyclohexene is formed, and thence recovering the cyclohexene.

2. The process of manufacturing 1,2-dimethylcyclohexene, comprising heating ethylene and 2,3-dimethyl-1,3-butadiene at a temperature below about 300° C. and at a pressure above 1000 pounds per square inch until the 1,2-dimethylcyclohexene is formed, and thence recovering the 1,2-dimethylcyclohexene.

LLOYD M. JOSHEL.

CERTIFICATE OF CORRECTION.

Patent No. 2,349,173.　　　　　　　　　　　　May 16, 1944.

LLOYD M. JOSHEL.

It is hereby certified that the above numbered patent was erroneously issued to "UNITED STATES OF AMERICA as REPRESENTED BY CLAUDE R. WICKARD, SECRETARY OF AGRICULTURE, and HIS SUCCESSORS IN OFFICE, as assignee, whereas said patent should have been issued to the inventor, said "JOSHEL"; in the grant, line 18, after "THEREOF." insert the following -

> --Provided, however that the said invention may be manufactured and used by or for the Government for governmental purposes without the payment of any royalty thereon.--;

and that the said Letters Patent should be read with correction therein that the same may conform to the record of the case in the Patent Office.

Signed and sealed this 15th day of August, A. D. 1944.

Leslie Frazer

(Seal)　　　　　　　　　　　　　　Acting Commissioner of Patents.